(12) United States Patent
Arukhe et al.

(10) Patent No.: US 10,982,516 B2
(45) Date of Patent: Apr. 20, 2021

(54) SYSTEMS AND METHODS FOR OPERATING DOWNHOLE INFLOW CONTROL VALVES TO PROVIDE SUFFICIENT PUMP INTAKE PRESSURE

(71) Applicant: Saudi Arabian Oil Company, Dhahran (SA)

(72) Inventors: James Ohioma Arukhe, Dhahran (SA); Obiomalotaoso Leonard Isichei, Dhahran (SA); Faisal Khelaiwi, Tanajib (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/558,432

(22) Filed: Sep. 3, 2019

(65) Prior Publication Data
US 2021/0062627 A1    Mar. 4, 2021

(51) Int. Cl.
*E21B 43/12* (2006.01)
*E21B 34/08* (2006.01)
*E21B 47/06* (2012.01)
*E21B 34/16* (2006.01)
*G05B 13/04* (2006.01)

(52) U.S. Cl.
CPC ........... *E21B 43/129* (2013.01); *E21B 34/08* (2013.01); *E21B 34/16* (2013.01); *E21B 47/06* (2013.01); *G05B 13/041* (2013.01)

(58) Field of Classification Search
CPC ........ E21B 43/129; E21B 43/13; E21B 34/16; E21B 34/08
See application file for complete search history.

(56) References Cited

U.S. PATENT DOCUMENTS

| 8,290,632 | B2 | 10/2012 | Briers et al. |
| 9,268,057 | B2 | 2/2016 | Abitrabi et al. |
| 9,671,524 | B2 | 6/2017 | Abitrabi et al. |
| 9,864,353 | B2 | 1/2018 | Tonkin et al. |
| 9,946,234 | B2 | 4/2018 | Foss et al. |
| 2009/0308601 | A1 | 12/2009 | Poe, Jr. et al. |

(Continued)

OTHER PUBLICATIONS

Arukhe, J.O. et al.; "Smart Well Completion Optimization in Multilateral Wells" SPE-188732-MS, Abu Dhabi International Petroleum Exhibition & Conference, Abu Dhabi, UAE, Nov. 13-16, 2017; pp. 1-10.

(Continued)

*Primary Examiner* — Kristyn A Hall
(74) *Attorney, Agent, or Firm* — Bracewell LLP; Constance G. Rhebergen; Christopher L. Drymalla

(57) ABSTRACT

Provided are techniques for operating a hydrocarbon well having inflow control valves (ICVs) and an electrical submersible pump (ESP) disposed in a wellbore of the well. Baseline production data is acquired for a relatively small subset of the possible operating configurations of ICVs in the well, the baseline data is assessed to model fluid pressure gradients in the wellbore, and the modeled fluid pressure gradients are used to estimate an ESP intake pressure for one or more configurations of the ICVs, and the ICVs are controlled to operate in accordance with an ICV configuration associated with an estimated ESP intake pressure that is within an operating intake pressure range for the ESP.

24 Claims, 7 Drawing Sheets

(56) References Cited

U.S. PATENT DOCUMENTS

2016/0054713 A1\* 2/2016 Foss .................. E21B 43/34
  700/282
2016/0061003 A1 3/2016 Gottumukkala et al.
2018/0030816 A1 2/2018 Devalve et al.

OTHER PUBLICATIONS

International Search Report and Written Opinion for International Application No. PCT/US2020/049203, report dated Dec. 22, 2020; pp. 1-14.

\* cited by examiner

| Table 1 - Production Data (for WHP of 370 psi) |||| 
|---|---|---|---|
|  | Valve States | Surface Flowrate (STB/day) | Intake Pressure (psi) |
| Motherbore Production Data | (5,0) | 2000 | 1500 |
|  | (8,0) | 4000 | 1800 |
|  | (10,0) | 5000 | 2000 |
| First Lateral Production Data | (0,5) | 2500 | 1500 |
|  | (0,8) | 4500 | 1900 |
|  | (0,10) | 6000 | 2200 |
| Comingled Production Data | (10,10) | 8000 | 2500 |

FIG. 3A

| Table 2 – Production Data (for WHP of 370 psi) |||| 
|---|---|---|---|
|  | Valve States | Surface Flowrate (STB/day) | Intake Pressure (psi) |
| Motherbore Production Data | (5,0,0) | 5000 | 1000 |
|  | (8,0,0) | 6000 | 1200 |
|  | (10,0,0) | 7000 | 1300 |
| First Lateral Production Data | (0,5,0) | 5500 | 1500 |
|  | (0,8,0) | 6500 | 1700 |
|  | (0,10,0) | 7500 | 2000 |
| Second Lateral Production Data | (0,0,5) | 4000 | 1200 |
|  | (0,0,8) | 4500 | 1400 |
|  | (0,0,10) | 5000 | 1500 |
| Comingled Production Data | (10,10,10) | 9000 | 2000 |

FIG. 3B

| State "Choke" Position | State "Choke" Area (Sq. in.) | State "Choke" Area (% of full) |
|---|---|---|
| Position 00 (fully closed) | 0 | 0% |
| Position 01 | 0.055 | 0.78% |
| Position 02 | 0.11 | 1.56% |
| Position 03 | 0.166 | 2.35% |
| Position 04 | 0.221 | 3.13% |
| Position 05 | 0.374 | 5.29% |
| Position 06 | 0.666 | 9.43% |
| Position 07 | 1.203 | 17.03% |
| Position 08 | 1.74 | 24.62% |
| Position 09 | 2.353 | 33.30% |
| Position 10 (fully opened) | 7.066 | 100.00% |

SYSTEMS AND METHODS FOR OPERATING DOWNHOLE INFLOW CONTROL VALVES TO PROVIDE SUFFICIENT PUMP INTAKE PRESSURE

FIELD

Embodiments relate generally to developing hydrocarbon reservoirs, and more particularly to operating inflow control valves of hydrocarbon wells to provide sufficient pump intake pressure.

BACKGROUND

A well generally includes a wellbore (or "borehole") that is drilled into the earth to provide access to a geologic formation below the Earth's surface (or a "subsurface formation"). A subsurface formation that contains, or that is expected to contain, a subsurface pool of hydrocarbons, such as oil and gas, is often referred to as a "hydrocarbon reservoir." In the petroleum industry, wells are often drilled to extract (or "produce") hydrocarbons from subsurface formations. Wells used to extract hydrocarbons are often referred to "hydrocarbon wells" or "oil wells" or "oil and gas wells."

Creating an oil well typically involves several stages, including a drilling stage, a completion stage and a production stage. The drilling stage normally involves drilling a wellbore into a reservoir. The drilling process is usually facilitated by a drilling rig that sits at the Earth's surface. The drilling rig provides for operating a drill bit to cut the wellbore, hoisting, lowering and turning drill pipe and tools, circulating drilling fluids in the wellbore, and generally controlling various operations in the wellbore (often referred to as "down-hole" operations). The completion stage involves making the well ready to produce hydrocarbons. In some instances, the completion stage includes installing casing pipe into the wellbore, cementing the casing in place, perforating the casing pipe and cement, installing production tubing, installing downhole valves and pumps for regulating production flow, and pumping fluids into the well to fracture, clean or otherwise prepare the reservoir and well to produce hydrocarbons. The production stage involves producing hydrocarbons from the reservoir by way of the well. During the production stage, the drilling rig is normally removed and replaced with a collection of valves at the surface, often referred to as a "production tree." The surface valves are operated in coordination with downhole valves to regulate pressure in the wellbore, control production flow from the wellbore and provides access to the wellbore in the event further completion work is needed. A pump jack or downhole pump can provide lift that assists in extracting hydrocarbons from the reservoir, especially in instances where the pressure in the well is so low that the hydrocarbons do not flow freely to the surface. Flow from an outlet valve of the production tree is normally connected to a distribution network of midstream facilities, such as tanks, pipelines and transport vehicles that transport the production to downstream facilities, such as refineries and export terminals.

Downhole valves often include inflow control valves (ICVs) that can be operated to regulate the flow of substances in the wellbore. In particular, ICVs can be installed in the wellbore to regulate the flow of substances, such as oil, gas and water, between the subsurface formation and a production conduit, such as casing or production tubing that provides a flow path to the surface. For example, in the case of a well being operated as a production well, a completion unit may include one or more ICVs that regulate the inflow of production fluids from a reservoir, into a central passage of the casing or production tubing that directs the production fluids to the surface for collection.

The operational state of an ICV is typically controlled remotely, for example, by a well control system at the surface. ICVs can be controlled to actuate between a fully-opened position and fully-closed position. The fully-opened position may include opening the entire flow area of the ICV to facilitate the flow of substances, such as production fluids, across the ICV. The fully-closed position may include closing the entire flow area of the ICV to block the flow of substances across the ICV. Normally, an ICV has several partially-opened positions that can be utilized to regulate flow through the ICV. For example, an ICV may have eleven states (or "settings" or "steps"), with state 0 being a 0% open position (or a "fully-closed" position), states 1-9 each being differing degrees of partially-opened positions, and state 10 being a 100% open position (or a "fully-opened" position). The state of an ICV may be dictated by a variety of factors, such as a desired flow rate or pressure, water cut (a volume of produced water with respect to total fluid production), and flow contribution of other portions of the well.

Downhole pumps can include electrical submersible pumps (ESPs) that can be operated to boost the pressure of production as it flows in the wellbore, on its way to the surface. For example, in the case of a well being operated as a production well, a completion unit may include an ESP disposed in the wellbore, upstream of the ICVs, to provide a boost in fluid pressure that helps to overcome pressure drop due to gravity and friction in the wellbore tubing between the ICVs and the surface.

SUMMARY

Applicants have recognized that electrical submersible pumps (ESPs) in hydrocarbon wells typically have certain operating parameters, such as an operating intake pressure range. An intake pressure may be defined by a fluid pressure that is present at an intake of the ESP, and an operating intake pressure range may define a range of intake pressures within which the ESP is designed to operate. The operating intake pressure range for an ESP may be defined, for example, by the manufacturer of the ESP. Operating an ESP outside of its operating intake pressure range may be detrimental to the ESP and associated production operations. For example, providing production fluid having a pressure that is below the operating intake pressure range for the ESP may result in cavitation of the fluid as it is pumped by the ESP. This is sometimes referred to as "starving" the ESP. Unfortunately, starving can cause damage to components of the ESP, such as premature wear of an impeller of the ESP. In the case of an ESP in a hydrocarbon production well, the starvation and associated damage of an ESP can be detrimental to production operations. For example, starvation can generate inefficiencies in the pumping process itself, such as requiring more power to achieve a desired fluid pressure boost. Further, resulting wear and damage to components of the ESP, such as damage to an impeller of the ESP, may lead to expensive and time consuming operations to service or replace the ESP. Accordingly, it is critical to maintain sufficient fluid intake pressures at ESPs in a hydrocarbon well.

Applicants have recognized that maintaining sufficient fluid intake pressures may be a product of operating inflow control valves (ICVs) in a manner to provide sufficient production fluid pressure at the intake of the ESP. Unfortunately, operating ICVs in such a manner is often a product of trial-and-error. For example, a well operator may adjust ICVs in a well to a given state to achieve a desired production rate, and subsequently monitor an intake pressure at an ESP to determine whether the resulting intake pressure is within the ESP's operating range. If not, the well operator may adjust the ICVs in the well to a second state and subsequently monitor the intake pressure at an ESP to determine whether the resulting intake pressure is within the ESP's operating range. This iterative (and reactive) approach may be repeated until the combination of a suitable production rate and intake pressure is achieved. Unfortunately, this can be a long, costly and inefficient process, as there may be significant time and costs associated with adjusting the ICVs to a given state and waiting for the intake pressure to settle into a steady-state after the adjustments. Also, this trial-and-error may result in an acceptable, but suboptimal setting of the ICVs. Moreover, during the period of trial-and-error, the ESP may be starved, leading to increased wear or damage to the ESP.

Recognizing these and other shortcomings of existing techniques for operating hydrocarbon wells employing ICVs and ESPs, Applicant has developed novel systems and methods for assessing and operating ICVs in a hydrocarbon well in a manner to maintain sufficient operating intake pressure for an ESP in the well. In some embodiments, baseline production data is acquired for a relatively small subset of the possible operating configurations of ICVs in a well, the baseline data is assessed to model fluid pressure gradients in the wellbore, and the modeled fluid pressure gradients are used to estimate an ESP intake pressure for one or more configurations of the ICVs, and the ICVs are controlled to operate in accordance with an ICV configuration associated with an estimated ESP intake pressure that is within an operating intake pressure range for the ESP.

Provided in some embodiment is a hydrocarbon well system including: ICVs disposed in a wellbore of a hydrocarbon well; an ESP disposed in the wellbore of the hydrocarbon well; and a well control system adapted to perform the following operations: conducting isolated production flow testing, including, for each ICV of the hydrocarbon well: identifying a set of isolated test states for the ICV, the set of isolated test states including at least two partially-opened valve states and a fully-opened valve state; closing the other ICVs of the hydrocarbon well to inhibit production flow through the other ICVs; and for each isolated test state of the set of isolated test states: operating, with the other ICVs closed, the ICV in the isolated test state to enable isolated production fluid flow through the ICV and the wellbore; and determining an intake pressure for the isolated test state, the intake pressure for the isolated test state including a fluid pressure of the isolated production fluid flow at an intake of the ESP while the ICV is operated in the isolated test state with the other ICVs closed; conducting comingled production flow testing, including: operating the ICVs in a comingled test state, operating the ICVs in the comingled test state including simultaneously operating ICVs in a fully-opened valve state to enable comingled production fluid flow through the wellbore; and determining an intake pressure for the comingled test state, the intake pressure for the comingled test state including a fluid pressure of the comingled production fluid flow at the intake of the ESP while the ICVs are operated in the comingled test state; determining an operating intake pressure range for the ESP; determining, for each isolated test state of each ICV of the hydrocarbon well and based on the intake pressure determined for the isolated test state, a model of isolated fluid pressure in the wellbore for the ICV operating in the isolated test state; determining, based on the intake pressure for the comingled test state, a model of comingled fluid pressure in the wellbore; determining a candidate operating configuration of the ICVs, the candidate operating configuration of the ICVs including a valve state combination for the ICVs; determining, based on the models of isolated fluid pressure in the wellbore and the model of comingled fluid pressure in the wellbore, a predicted intake pressure at the intake of the ESP for the candidate operating configuration; determining that the predicted intake pressure at the intake of the ESP is within the operating intake pressure range for the ESP; and operating, in response to determining that the predicted intake pressure at the intake of the ESP is within the operating intake pressure range for the ESP, the ICVs in the candidate operating configuration.

In some embodiments, the operations further include: determining a first candidate operating configuration of the ICVs, the first candidate operating configuration of the ICVs including a first valve state combination for the ICVs; determining, based on the models of isolated fluid pressure in the wellbore and the model of comingled fluid pressure in the wellbore, a first predicted intake pressure at the intake of the ESP for the first candidate operating configuration of the ICVs; determining that the first predicted intake pressure at the intake of the ESP is not within the operating intake pressure range for the ESP; and identifying, in response to determining that the first predicted intake pressure at the intake of the ESP is not within the operating intake pressure range for the ESP, the candidate operating configuration of the ICVs. In certain embodiments, the candidate operating configuration of the ICVs specifies a respective valve state for each of the ICVs of the hydrocarbon well, and where operating the ICVs in the candidate operating configuration includes, for each ICV of the ICVs of the hydrocarbon well, operating the ICV in the respective valve state specified for the ICV in the candidate operating configuration while maintaining a given wellhead pressure. In some embodiments, the operations further include: determining possible operating configurations of the ICVs; and for each of the possible operating configurations of the ICVs: determining, based on the models of isolated fluid pressure in the wellbore and the model of comingled fluid pressure in the wellbore, a predicted intake pressure at the intake of the ESP for the possible operating configuration of the ICV, where the candidate operating configuration of the ICVs is one of the possible operating states of the ICVs. In certain embodiments, the possible operating configurations of the ICVs include all possible combinations of states of the ICVs of the hydrocarbon well. In some embodiments, the model of isolated fluid pressure in the wellbore for the ICV operating in the isolated test state includes a gradient of fluid pressure in the wellbore for the ICV operating in the isolated test state, and where the model of comingled fluid pressure in the wellbore includes a gradient of fluid pressure in the wellbore for the ICVs operating in the comingled test state. In certain embodiments, determining the predicted intake pressure at the intake of the ESP for the candidate operating state of the ICVs includes determining a linear relationship of intake pressure to flow rate, determining an estimated flow rate for the candidate operating state of the ICVs, and determining the predicted intake pressure at the intake of the ESP for the candidate operating state of the ICVs based on application of the estimated flow rate for the candidate operating state of the ICVs to the linear relationship of intake pressure to flow rate. In some embodiments, the at least two partially opened valve states include a first valve state including a choke of about 1-10%, and a second valve state including a choke of about 11-50%.

Provided in some embodiments is a method of operating a hydrocarbon well having ICVs and an ESP disposed in a wellbore of the hydrocarbon well. The method including: conducting isolated production flow testing, including, for each ICV of the hydrocarbon well: identifying a set of isolated test states for the ICV, the set of isolated test states including at least two partially-opened valve states and a fully-opened valve state; closing the other ICVs of the hydrocarbon well to inhibit production flow through the other ICVs; and for each isolated test state of the set of isolated test states: operating, with the other ICVs closed, the ICV in the isolated test state to enable isolated production fluid flow through the ICV and the wellbore; and determining an intake pressure for the isolated test state, the intake pressure for the isolated test state including a fluid pressure of the isolated production fluid flow at an intake of the ESP while the ICV is operated in the isolated test state with the other ICVs closed; conducting comingled production flow testing, including: operating the ICVs in a comingled test state, operating the ICVs in the comingled test state including simultaneously operating ICVs in a fully-opened valve state to enable comingled production fluid flow through the wellbore; and determining an intake pressure for the comingled test state, the intake pressure for the comingled test state including a fluid pressure of the comingled production fluid flow at the intake of the ESP while the ICVs are operated in the comingled test state; determining an operating intake pressure range for the ESP; determining, for each isolated test state of each ICV of the hydrocarbon well and based on the intake pressure determined for the isolated test state, a model of isolated fluid pressure in the wellbore for the ICV operating in the isolated test state; determining, based on the intake pressure for the comingled test state, a model of comingled fluid pressure in the wellbore; determining a candidate operating configuration of the ICVs, the candidate operating configuration of the ICVs including a valve state combination for the ICVs; determining, based on the models of isolated fluid pressure in the wellbore and the model of comingled fluid pressure in the wellbore, a predicted intake pressure at the intake of the ESP for the candidate operating configuration; determining that the predicted intake pressure at the intake of the ESP is within the operating intake pressure range for the ESP; and operating, in response to determining that the predicted intake pressure at the intake of the ESP is within the operating intake pressure range for the ESP, the ICVs in the candidate operating configuration.

In some embodiments, the method further includes: determining a first candidate operating configuration of the ICVs, the first candidate operating configuration of the ICVs including a first valve state combination for the ICVs; determining, based on the models of isolated fluid pressure in the wellbore and the model of comingled fluid pressure in the wellbore, a first predicted intake pressure at the intake of the ESP for the first candidate operating configuration of the ICVs; determining that the first predicted intake pressure at the intake of the ESP is not within the operating intake pressure range for the ESP; and identifying, in response to determining that the first predicted intake pressure at the intake of the ESP is not within the operating intake pressure range for the ESP, the candidate operating configuration of the ICVs. In certain embodiments, the candidate operating configuration of the ICVs specifies a respective valve state for each of the ICVs of the hydrocarbon well, and where operating the ICVs in the candidate operating configuration includes, for each ICV of the ICVs of the hydrocarbon well, operating the ICV in the respective valve state specified for the ICV in the candidate operating configuration while maintaining a given wellhead pressure. In some embodiments, the method further includes: determining possible operating configurations of the ICVs; and for each of the possible operating configurations of the ICVs: determining, based on the models of isolated fluid pressure in the wellbore and the model of comingled fluid pressure in the wellbore, a predicted intake pressure at the intake of the ESP for the possible operating configuration of the ICV, where the candidate operating configuration of the ICVs is one of the possible operating states of the ICVs. In certain embodiments, the possible operating configurations of the ICVs include all possible combinations of states of the ICVs of the hydrocarbon well. In some embodiments, the model of isolated fluid pressure in the wellbore for the ICV operating in the isolated test state includes a gradient of fluid pressure in the wellbore for the ICV operating in the isolated test state, and where the model of comingled fluid pressure in the wellbore includes a gradient of fluid pressure in the wellbore for the ICVs operating in the comingled test state. In certain embodiments, determining the predicted intake pressure at the intake of the ESP for the candidate operating state of the ICVs includes determining a linear relationship of intake pressure to flow rate, determining an estimated flow rate for the candidate operating state of the ICVs, and determining the predicted intake pressure at the intake of the ESP for the candidate operating state of the ICVs based on application of the estimated flow rate for the candidate operating state of the ICVs to the linear relationship of intake pressure to flow rate. In some embodiments, the at least two partially opened valve states include a first valve state including a choke of about 1-10%, and a second valve state including a choke of about 11-50%.

Provided in some embodiments is a non-transitory computer readable medium including program instructions stored thereon that are executable by a processor to cause the described method operations for operating a hydrocarbon well having ICVs and an ESP disposed in a wellbore of the hydrocarbon well.

BRIEF DESCRIPTION OF THE DRAWINGS

FIGS. 3A and 3B are tables that illustrate example production data in accordance with one or more embodiments.

Figure 1:
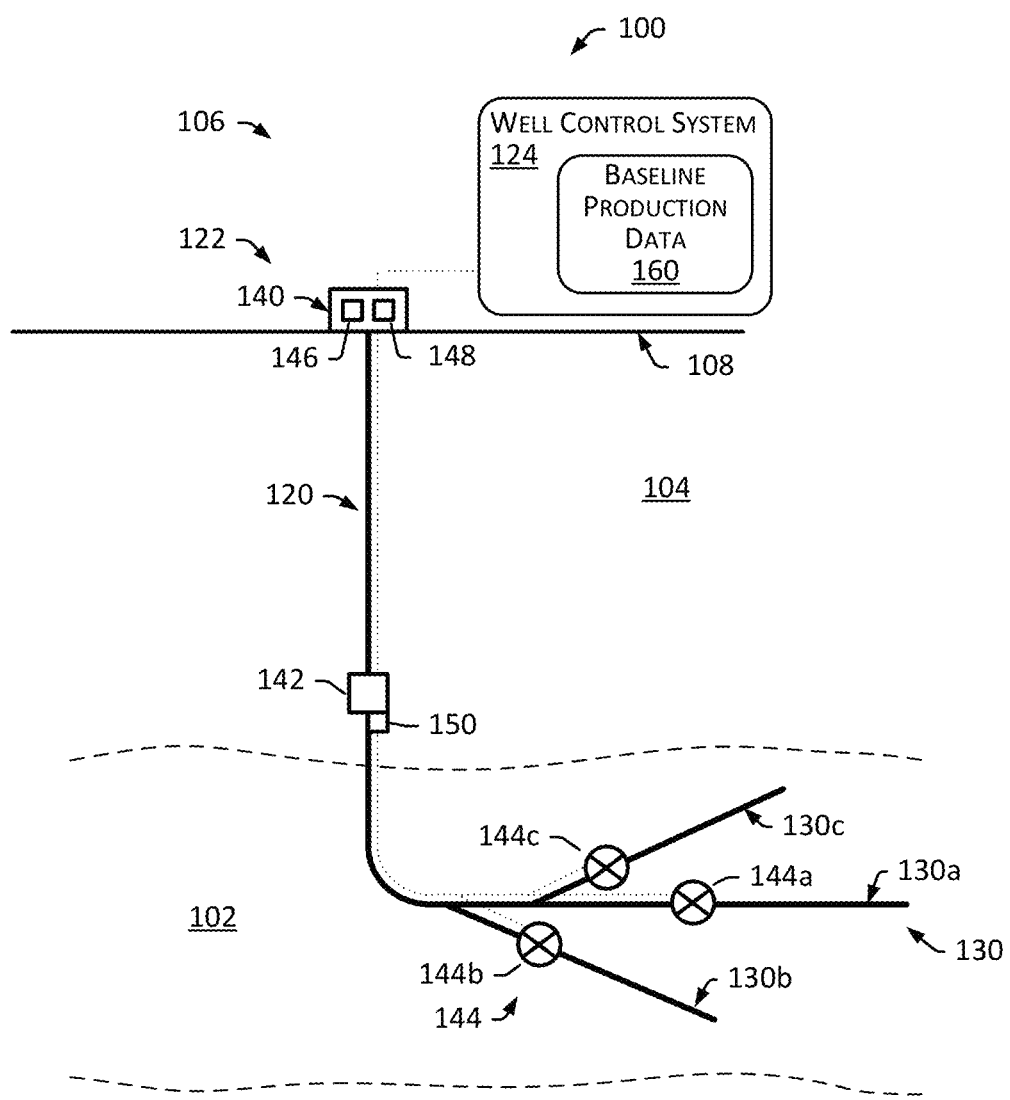
FIG. 1 is diagram that illustrates a hydrocarbon well environment in accordance with one or more embodiments.

While this disclosure is susceptible to various modifications and alternative forms, specific embodiments are shown by way of example in the drawings and will be described in detail. The drawings may not be to scale. It should be understood that the drawings and the detailed descriptions are not intended to limit the disclosure to the particular form disclosed, but are intended to disclose modifications, equivalents, and alternatives falling within the spirit and scope of the present disclosure as defined by the claims.

DETAILED DESCRIPTION

Described are embodiments of novel systems and methods for

Although embodiments are described in the context of ICVs and ESPs of a hydrocarbon well for the purpose of illustration, embodiments may include other types of valves or pumps, and may be employed in other types of wells.

FIG. 1 is diagram that illustrates a hydrocarbon well environment 100 in accordance with one or more embodiments. In the illustrated embodiment, the well environment 100 includes a hydrocarbon reservoir ("reservoir") 102, located in a subsurface formation ("formation") 104, and a hydrocarbon well system ("well") 106.

The formation 104 may include a porous or fractured rock formation that resides underground, beneath the Earth's surface ("surface") 108. The reservoir 102 may include a portion of the formation 104 that contains (or that is determined to contain) a subsurface pool of hydrocarbons, such as oil and gas. The formation 104 and the reservoir 102 may each include different layers of rock having varying characteristics, such as varying degrees of permeability, porosity, and resistivity. In the case of the well 106 being operated as a production well, the well 106 may facilitate the extraction of hydrocarbons (or "production") from the reservoir 102.

The well 106 may include a wellbore 120, a production system 122, and a well control system ("control system") 124. The wellbore 120 may include a bored hole that extends from the surface 108 into a target zone of the formation 104, such as the reservoir 102. The wellbore 120 may be created, for example, by a drill bit boring through the formation 104 and the reservoir 102. An upper end of the wellbore 120, at or near the surface 108, may be referred to as the "up-hole" end of the wellbore 120, and a lower end of the wellbore, terminating in the formation 104, may be referred to as the "down-hole" end of the wellbore 120. The wellbore 120 may include one or more laterals (or "branches") 130. For example, in the illustrated embodiment, the wellbore 120 includes a motherbore lateral 130a, a first lateral 130b, and a second lateral 130c. The motherbore lateral 130a may be defined by a primary borehole, and the first and second laterals 130b and 130c may be defined by secondary boreholes that extend from the primary borehole. Although the illustrated embodiment includes three laterals, certain embodiments are described in the context of the well 106 having only two laterals (with reference to FIG. 1), for the purpose of illustration. Further, although embodiments are described in the context of wells having two or three laterals for the purpose of illustration, embodiments may be applied to wells having any number of laterals, such as well having four, five, six or more laterals.

The production system 122 may include components that facilitate monitoring or regulating the flow of production through the wellbore 120. For example, the production system 122 may include a wellhead 140, an electric submersible pump (ESP) 142, and inflow control valves 144. The wellhead 140 may include a collection of valves located at the up-hole end of the wellbore 120 (for example, a production tree or other valves located at the surface 108) that regulate and direct the flow of production fluid exiting the wellbore 120. In some embodiments, the wellhead 140 includes a wellhead pressure sensor (or "surface pressure sensor") 146 or a wellhead flow rate sensor 148. The wellhead pressure sensor 146 may include a pressure sensor that measures the pressure of production fluid at the up-hole end of the wellbore 120. This pressure may be referred to as the "surface pressure" of the well 106. The wellhead flow rate sensor 148 may include a flow rate sensor that measures the flow rate of production fluid exiting the wellbore 120. This flow rate may be referred to as the "production rate" of the well 106.

The ESP 142 may be an electrically powered fluid pump installed at some depth in the wellbore 120 that can be operated to boost the pressure of production fluid as it flows up the wellbore 120, on its way to the surface 108. For example, the ESP 142 may be located in the wellbore 120 (several thousand feet below the surface 108), and be operated to pump the production fluid up the wellbore 120, to provide an increase in production fluid pressure that helps to overcome pressure drop in the wellbore 120 attributable to gravity and friction in the wellbore 120. The ESP 142 may draw production fluid in from a down-hole portion of the wellbore 120 through an intake of the ESP 142, pressurize the fluid, and expel the pressurized production fluid into an up-hole portion of the wellbore 120 through an outlet of the ESP 142.

In some embodiments, the production system 122 includes an intake pressure sensor 150. The intake pressure sensor 150 may include a downhole pressure sensor that is located at or near an intake of the ESP 142 (for example, located within 10 m downhole of the intake of the ESP 142). The intake pressure sensor 150 may measure the pressure of production fluid at or near the intake of the ESP 142. This pressure may be referred to as the "intake pressure" of the ESP 142. The intake pressure of the ESP 142 may be indicative of the pressure of production fluid as it enters the ESP 142, before it is subjected to pumping that increases the pressure of the production fluid. The ESP 142 may be associated with an operating intake pressure range that defines a range of intake pressure within which the ESP 142 is designed to operate. For example, the ESP 142 may be associated with an operating intake pressure range of about 2,300-3,000 pounds-per-square inch (psi). The operating intake pressure range for an ESP may be defined, for example, by the manufacturer of the ESP 142. As described here, embodiments may include operating the ICVs 144 of well 106 to provide an intake pressure that is within the operating intake pressure range for the ESP 142.

The ICVs 144 may include valves that can be operated to regulate the flow of production from different laterals of the wellbore 120. For example, in the illustrated embodiment, the production system 122 includes a "motherbore" ICV 144a that is operable to regulate the flow of production fluid from the motherbore 130a, a "first lateral" ICV 144b that is operable to regulate the flow of production fluid from the first lateral 130b, and a "second lateral" ICV 144c that is operable to regulate the flow of production fluid from the second lateral 130c.

Each of the ICVs 144 may be operable to actuate between a fully-opened position and fully-closed position. The fully-opened position may include opening an entire flow area of the ICV 144 to facilitate the flow of substances, such as production fluid, across the ICV 144. The fully-closed position may include closing the entire flow area of the valve to block the flow of substances across the ICV 144. Each ICV 144 may have several partially-opened positions that can be utilized to regulate (or "choke") flow through the ICV 144. For example, an ICV 144 may have eleven states (or "settings" or "steps"), 0-10, with state 0 being a 0% open position (or a "fully-closed" position), states 1-9 each being differing degrees of partially-opened positions, and state 10 being a 100% open position (or a "fully-opened" position). The state of an ICV 144 may be dictated by a variety of factors, such as a desired flow rate and pressure, water cut (for example, a ratio of the volume of produced water to total fluid production), or flow contribution of other portions of the well 106. The operational state of the ICVs may controlled remotely, for example, by the control system 124.

The control system 124 may control various operations of the well 106, such as well drilling operations, well completion operations, well production operations, or well or formation monitoring operations. In some embodiments, the control system 124 includes a computer system that is the same as or similar to that of computer system 1000 described with regard to at least FIG. 8. In some embodiments, the control system 124 conducts baseline testing of the ICVs 144 (for example, including acquiring (and storing) baseline production data 160 for a relatively small subset of possible configurations of the ICVs 144 of the well 106), identifies an ICV operating configuration that satisfies the operating intake pressure for the ESP 142, and operates the ICVs 144 in accordance with the ICV operating configuration.

Figure 2:
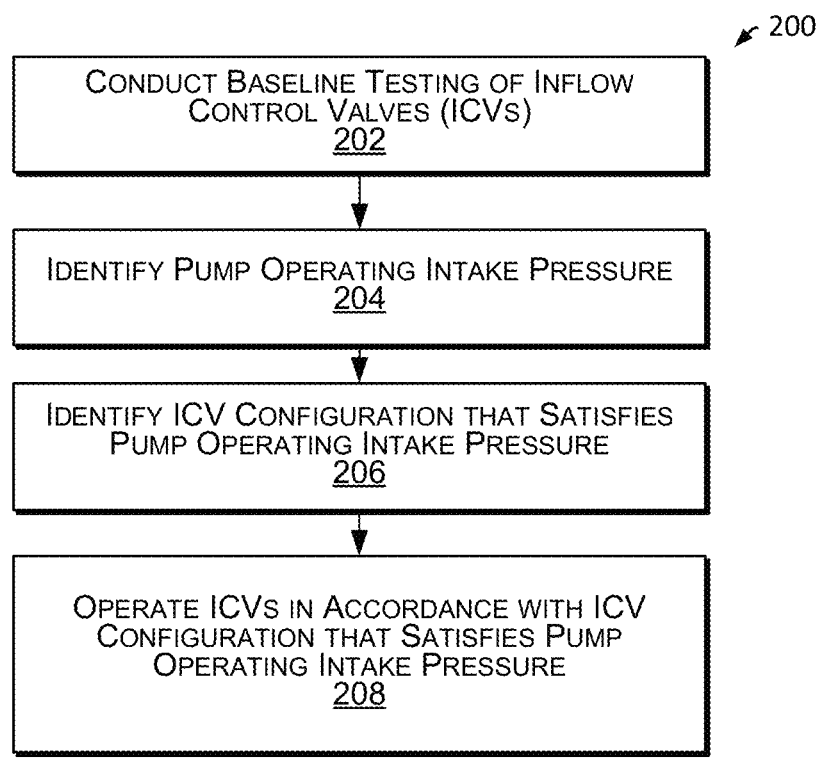
FIG. 2 is a flowchart that illustrates a method of operating hydrocarbon well in accordance with one or more embodiments.

FIG. 2 is a flowchart that illustrates a method 200 of operating a hydrocarbon well ICVs in accordance with one or more embodiments. In some embodiments, some or all of the operations of method 200 are performed by the control system 124, or another well operator. Method 200 may include conducting baseline testing of ICVs (block 202), identifying pump operating intake pressure (block 204), identifying an ICV operating configuration that satisfies the pump operating intake pressure (block 206), and operating the ICVs in accordance with the ICV operating configuration that satisfies the pump operating intake pressure (block 208).

In some embodiments, conducting baseline testing of ICVs (block 202) includes acquiring baseline production data for a relatively small subset of the possible configurations of the ICVs of a hydrocarbon well. For example, conducting baseline testing of ICVs may include the following: (1) conducting isolated production flow testing that includes, for each ICV 144 of the well 106, performing the following: (a) identifying a set of isolated test states for the ICV 144 (for example, a set of isolated test states including at least two partially opened valve states and a fully-opened valve state); (b) closing the other ICVs 144 of the well 106 to inhibit production flow through the other ICVs 144 and the associated laterals 130; and (c) for each isolated test state of the set of isolated test states: (i) operating, with the other ICVs 144 closed, the ICV 144 in the isolated test state to enable isolated production fluid flow through the ICV 144, the associated lateral 130 and the wellbore 120 (for example, such that the production fluid flow through the wellbore 120 is a result of the isolated contribution of the lateral 130 that includes the ICV 144); and (ii) determining an intake pressure for the isolated test state (for example, measuring or calculating the intake pressure of the ESP 142 while the ICV 144 is operated in the isolated test state with the other ICVs 144 closed); and (2) conducting comingled production flow testing that includes the following: (a) operating the ICVs 144 in a comingled test state that includes simultaneously operating the ICVs 144 of the well 106 in a fully-opened valve state to enable comingled production fluid flow through the wellbore 120; and (b) determining an intake pressure for the comingled test state (for example, measuring or calculating the intake pressure of the ESP 142 while all of the ICVs 144 are operated in the comingled test state). In some embodiments, the at least two partially opened valve states includes a first partially opened valve state having a relatively small partial opening (or a relatively high "choke") in the range of about 1-10% of the fully-opened area, and a second partially opened valve state having a moderate partial opening (or a moderate "choke") in the range of about 11-50% of the fully-opened area. For example referring to the table of FIG. 6, the first valve state may be one of positions 01-06 and the second valve state may be one of positions 07-09. In some embodiments, the isolated production flow testing and comingled production flow testing are completed at a given flowing wellhead pressure (FWHP) (or "wellhead pressure" (WHP)). For example, in response to observing a flowing wellhead pressure (FWHP) (or "wellhead pressure" (WHP)) of about 370 pounds per square inch (psi) for the comingled test state, a baseline WHP of about 370 psi may be determined, and the isolated production flow testing may include maintaining the baseline WHP of about 370 psi during testing at each of the isolated test states. Thus, WHP of the well 106 may be maintained while the surface flow rate of the well 106 and intake pressure of the ESP 142 vary for the different configurations of the ICVs 144.

Referring to the well 106 of FIG. 1, and an example including the motherbore 130a and the first lateral 130b (and not including lateral 130c), conducting baseline testing of ICVs may include the following (1) (a) identifying valve states (or "settings") of 5, 8 and 10 for each of the ICVs 144a and 144b; (b) closing the first lateral ICV 144b, (c) sequentially operating the motherbore ICV 144a at the states of 5, 8 and 10, and acquiring "motherbore" baseline production data 160 that includes, for each of the states of the motherbore ICV 144a (including valve states (or "valve configurations") (5,0), (8,0) and (10,0)), a production flow rate and an intake pressure of the ESP 142; (d) closing the motherbore ICV 144a, (e) sequentially operating the first lateral ICV 144b at the states of 5, 8 and 10, and acquiring "first lateral" baseline production data 160 that includes, for each of the states of the first lateral ICV 144b (including valve states (0,5), (0,8) and (0,10)), a production flow rate and an intake pressure of the ESP 142; and (f) simultaneously operating the motherbore ICV 144a and the first lateral ICV 144b at a setting of 10, and acquiring baseline "comingled" production data that includes the corresponding production flow rate and ESP intake pressure for the valve state (10,10). Table 1 of FIG. 3A illustrates example baseline production data 160 for baseline testing of the two lateral well 106 (having motherbore 130a and the first lateral 130b) in accordance with the embodiment described.

Referring to the well 106 of FIG. 1, and an example including the motherbore 130a, the first lateral 130b and the second lateral 130c, conducting baseline testing of ICVs may include the following (1) (a) identifying valve states of 5, 8 and 10 for each of the ICVs 144a, 144b and 144c; (b) closing the first lateral ICV 144b and the second lateral ICV 144c, (c) sequentially operating the motherbore ICV 144a at the states of 5, 8 and 10, and acquiring "motherbore" baseline production data 160 that includes, for each of the states of the motherbore ICV 144a (including valve states (5,0,0), (8,0,0) and (10,0,0)), a production flow rate and an intake pressure of the ESP 142; (d) closing the motherbore ICV 144a and the second lateral ICV 144c, (e) sequentially operating the first lateral ICV 144b at the states of 5, 8 and 10, and acquiring "first lateral" baseline production data 160 that includes, for each of the states of the first lateral ICV 144*b* (including valve states (0,5,0), (0,8,0) and (0,10,0)), a production flow rate and an intake pressure of the ESP 142; (f) closing the motherbore ICV 144*a* and the first lateral ICV 144*b*, (g) sequentially operating the second lateral ICV 144*c* at the states of 5, 8 and 10, and acquiring "second lateral" baseline production data 160 that includes, for each of the states of the second lateral ICV 144*c* (including valve states (0,0,5), (0,0,8) and (0,0,10)), a production flow rate and an intake pressure of the ESP 142; and (h) simultaneously operating the motherbore ICV 144*a*, the first lateral ICV 144*b* and the second lateral ICV 144*c* at a state of 10 (a fully-opened valve state), and acquiring baseline "comingled" production data 160 that includes, the corresponding production flow rate and an intake pressure of the ESP 142 for the valve state (10,10,10). Table 2 of FIG. 3B illustrates example production data 160 for baseline testing of the three lateral well 106 (including the motherbore 130*a*, the first lateral 130*b* and the second lateral 130*c*) in accordance with one or more embodiments.

The production flow rate may be the flow rate of production from the well 106. For example, the production flow rate may be measured by a flow rate sensor located at the up-hole end of the wellbore 120 of the well 106, such as the wellhead flow rate sensor 148. The intake pressure of the ESP 142 may be a fluid pressure at an intake of the ESP 142. For example, the intake pressure of the ESP 142 may be may be fluid pressure measured by a downhole pressure sensor located at or near the intake of the ESP 142, such as the intake pressure sensor 150.

In some embodiments, identifying a pump operating intake pressure (block 204) includes determining an operating intake pressure range for an ESP in the hydrocarbon well. For example, identifying a pump operating intake pressure may include determining or otherwise obtaining an operating intake pressure range for the ESP 142. The operating intake pressure range may be specified, for example, by a manufacturer of the ESP 142. The operating intake pressure range may be, for example, 2,300-3,000 psi.

In some embodiments, identifying an ICV operating configuration that satisfies the pump operating intake pressure (block 206) includes determining, for one, some or all of the possible operating configurations of the ICVs, a predicted (or "estimated") intake pressure for the ESP based on the results of the baseline testing of the ICVs, and identifying one of the possible operating configurations having a predicted intake pressure that satisfies the operating intake pressure for an ESP. For example, identifying an ICV operating configuration that satisfies the pump operating intake pressure may include the following: (1) determining, for each isolated test state of each ICV 144 of the well 106 and based on the intake pressure determined for the ICV 144 operating in the isolated test state, a model (for example, a gradient) of isolated fluid pressure in the wellbore 120 for the ICV 144 operating in the isolated test state; (2) determining, based on the intake pressure for the comingled test state, a model (for example, a gradient) of comingled fluid pressure in the wellbore 120 for the ICVs 144 operating in the comingled test state; (3) determining one or more "candidate" operating configurations of the ICVs 144, including one, some or all possible valve state combinations for the ICVs 144; and (4) determining, for each of the one or more "candidate" operating configurations and based on the models of isolated fluid pressure in the wellbore 120 or the model of comingled fluid pressure in the wellbore 120, a predicted intake pressure for the ESP 142 for the candidate operating configuration of the ICVs 144. The one or more "candidate" operating configurations may include one, some or all of the possible operating configurations of the ICVs 144, and each of the operating configurations that are within the operating intake pressure range for the ESP 142 may be identified as an operating configuration that satisfies the pump operating intake pressure. For example, a particular one of the operating configurations that is associated with a predicted intake pressure that is within the operating intake pressure range for the ESP 142, may be identified as the operating configuration that satisfies the pump operating intake pressure.

Figure 4A:
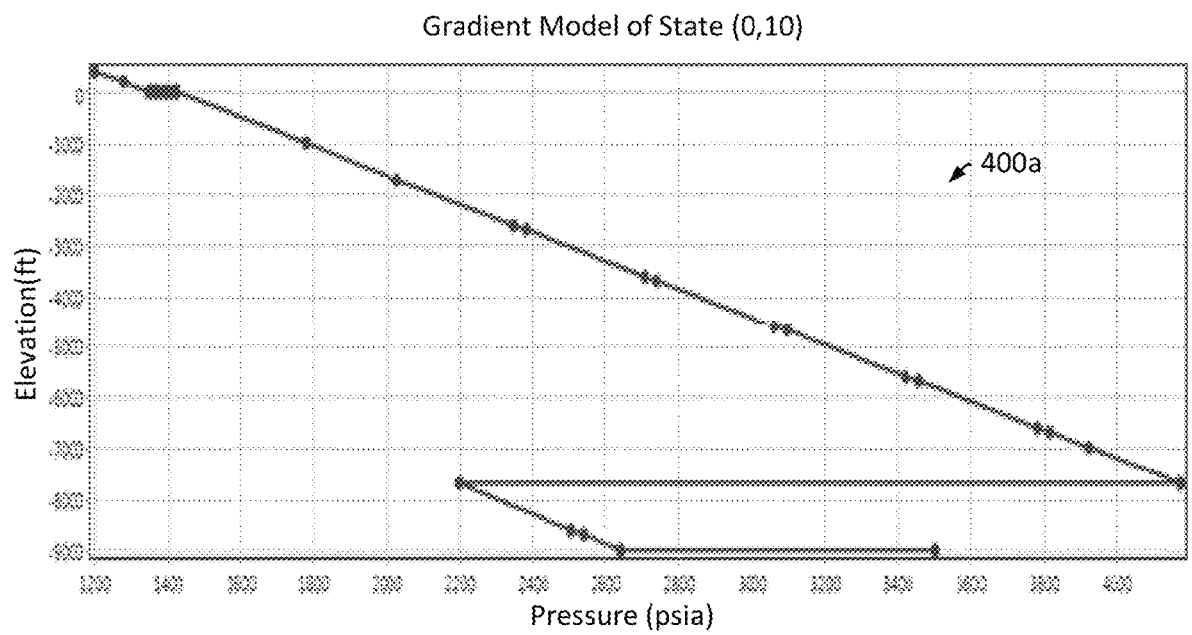
FIGS. 4A and 4B are plots that illustrate example models of fluid pressure in accordance with one or more embodiments.

Continuing with the example regarding the well 106 of FIG. 1 including two wellbore laterals 130*a* and 130*b*, and the baseline production data 160 of Table 1, identifying an ICV operating configuration that satisfies the pump operating intake pressure may include (1) determining, for each of the isolated test states (5,0), (8,0), (10,0), (0,5), (0,8) and (0,10), based on the intake pressure of Table 1 determined for the ICV 144 operating in the isolated test state, a model of isolated fluid pressure in the wellbore 120 for the ICV 144 operating in the isolated test state. FIG. 4A is a plot that illustrates an example model 400*a* of isolated fluid pressure in the wellbore 120 for the ICVs 144 operating in the isolated test state of (0,10) based on production data of Table 1 of FIG. 3A. As illustrated by the model 400*a*, the production fluid of a specific density moves from the reservoir 102 (having a reservoir of pressure of about 4,000 psi) through the wellbore 120, to the ESP 142 located at a depth of about 7,800 ft. The flowing bottom hole pressure (BHP) of the production fluid is about 2,650 psi, the pressure decreases with height to a static pressure of about 2,200 psi at the intake of the ESP 142 (that is, an intake pressure of about 2,200 psi), the pumping delivered by the ESP 142 boosts the production fluid pressure by about 2,000 psi to about 4,200 psi (which is greater than the reservoir pressure), and the production fluid experiences pressure drop (for example, due to gravity and friction along the tubing in the wellbore 120) to the surface 108 at the manifold pressure of about 1,450 psi, and the manifold pressure drops as the fluid flows along the flowline to the riser to a surface pressure (or "wellhead pressure" (WHP)) of about 1,350 psi. Note that the fluid gradients ($\rho*g$) are represented by the equal slopes from about 2,650 psi to about 2,000 psi and about 4,200 psi to about 1,450 psi. Based on this model of fluid gradient, the fluid density, water-cut, etc. can be estimated. This model 400*a* reflects the ESP intake pressure of about 2,200 psi in the production data of Table 1 of FIG. 3A for the isolated test state of (0,10). Such a model may be generated, for example, using physics correlation software that models pressure drop, such as PIPESIM software provided by Schlumberger having headquarters in Houston, Tex., USA. A similar modeling may be generated for each of the other isolated test states of (5,0), (8,0), (10,0), (0,5) and (0,8). Similar "isolated" modeling may be completed for wells including more than two laterals. For example, in the alternate example of the well 106 including three laterals, a similar modeling may be generated for each of the isolated test states (5,0,0), (8,0,0), (10,0,0), (0,5,0), (0,8,0), (0,10,0), (0,0,5), (0,0,8) and (0,0,10) based on the production data of Table 2 of FIG. 3B.

Continuing with the example regarding the well 106 of FIG. 1 including two wellbore laterals 130*a* and 130*b*, and the baseline production data 160 of Table 1, identifying an ICV operating configuration that satisfies the pump operating intake pressure may also include (2) determining, based on the intake pressure for the comingled test state (10,10) of Table 1, a model of comingled fluid pressure in the wellbore 120 for the ICVs 144 operating in the comingled test state.

Figure 4B:
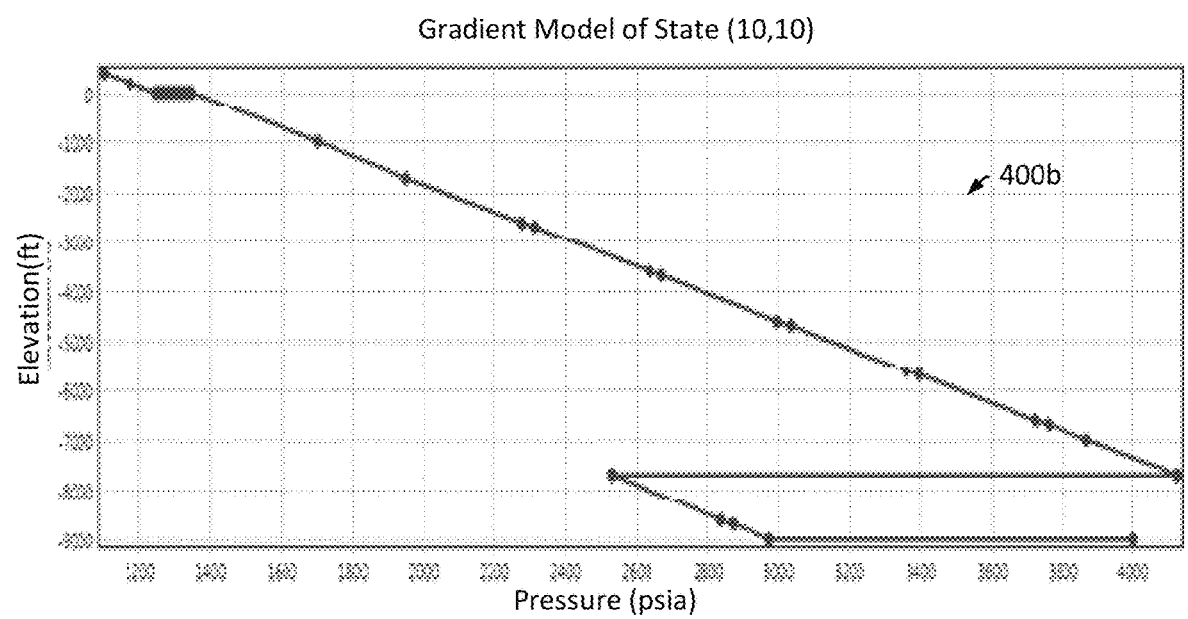

FIG. 4B is a plot that illustrates an example model 400b of isolated fluid pressure in the wellbore 120 for the ICVs 144 operating in the comingled test state of (10,10), based on corresponding production data of Table 1 of FIG. 3A. As illustrated by the model 400b, the production fluid of a specific density moves from the reservoir 102 (having a reservoir of pressure of about 4,000 psi) through the wellbore 120, to the ESP 142 located at a depth of about 7,800 ft. The flowing BHP of the production fluid is about 3,000 psi, the pressure decreases with height to a static pressure of about 2,500 psi at the intake of the ESP 142 (that is, an intake pressure of about 2,500 psi), the pumping delivered by the ESP 142 boosts the production fluid pressure by about 1,700 psi to about 4,200 psi (which is greater than the reservoir pressure), and the production fluid experiences pressure drop (for example, due to gravity and friction along the tubing in the wellbore 120) to the surface 108 at the manifold pressure of about 1,450 psi, and the manifold pressure drops as the fluid flows along the flowline to the riser to a surface pressure (or WHP) of about 1,350 psi. Note that the fluid gradients ($\rho*g$) are represented by the equal slopes from about 3,000 psi to about 2,500 psi and about 4,200 psi to about 1,300 psi. Based on this model 400b of fluid gradient, the fluid density, water-cut, etc. can be estimated. This model 400b reflects the ESP intake pressure of 2,500 psi in the production data of Table 1 of FIG. 3A for the comingled test state of (10,10). Such a model may be generated, for example, using physics correlation software that models pressure drop, such as PIPESIM software provided by Schlumberger having headquarters in Houston, Tex., USA. Similar "comingled" modeling may be completed for wells including more than two laterals. For example, in the alternate example of the well 106 including three wellbore segments, a similar modeling may be generated for the comingled test state (10,10,10) based on the production data of Table 2 of FIG. 3B.

Figures 5, 6:
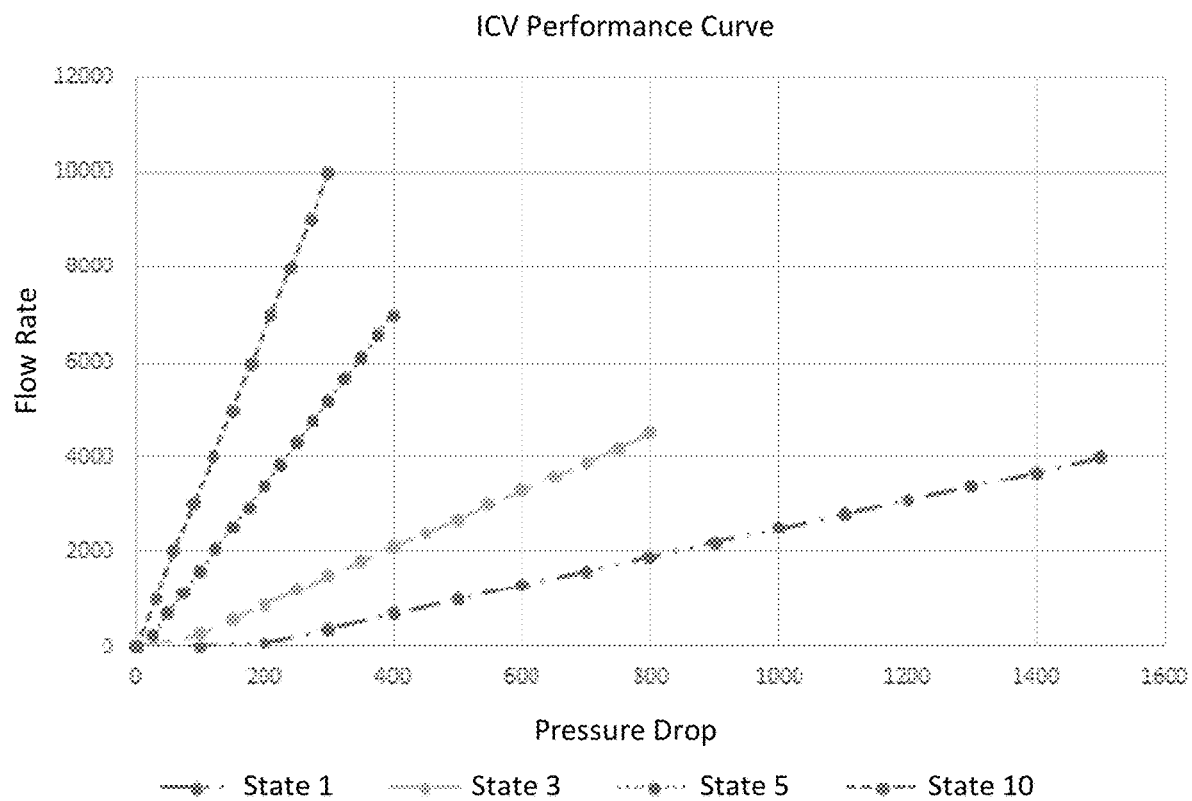
FIG. 5 is a diagram that illustrates example ICV performance curves in accordance with one or more embodiments.
FIG. 6 is a table that illustrates example characteristics of an ICV for different valve states in accordance with one or more embodiments.

Notably, the modeling of the drop from reservoir pressure to flowing BHP may be attributable to a pressure drop across the ICV 144 at the given valve state and production flow rate, and may be determined using ICV performance curves (or "choke curves") that define relationships between valve states and production flow rate through the ICV 144. FIG. 5 is a diagram that illustrates example ICV performance curves for an ICV at different states, in accordance with one or more embodiments. Such ICV performance curves for an ICV may, for example, be provided a manufacture of the ICV or be generated based on testing of the ICV. The example ICV performance curves include normalized curves for an ICV, including respective curves for states (or "settings" or "positions") 1, 5, 8 and 10 (with 10 having the highest valve opening diameter, and position 1 having the smallest valve diameter opening short of being fully closed). As can be seen, for a given valve state, the pressure drop increases with an increase in flow rate, and the relative increase in pressure drop is lower for states with larger openings. In modeling of the ICV 144, such ICV performance curves can be employed to model the pressure drop across the ICV 144, factoring in the level of restriction placed on the ICV for the given flow rate through the ICV 144. FIG. 6 is a table that illustrates example states (or "positions") and corresponding opening size characteristics for an ICV (or "choke") in accordance with one or more embodiments. In the illustrated embodiment, the ICV has eleven discrete states, ranging from fully-closed (Position 00) to fully-opened (Position 10). The table also indicates, for each state, a corresponding size of the opening for fluid to pass through, and a percentage indicating the size of the area of the opening relative to the fully-opened area.

Identifying an ICV operating configuration that satisfies the pump operating intake pressure may also include (3) determining one or more "candidate" operating configurations of the ICVs 144 (for example, one or more possible valve state combinations for the ICVs 144 of the well 106), and (4) for each of the one or more candidate operating configurations, determining, based on the models of isolated fluid pressure in the wellbore 120 and the model of comingled fluid pressure in the wellbore 120, a predicted (or "estimated") intake pressure for the ESP 142 for the candidate operating configuration of the ICVs 144. Continuing with the example regarding the well 106 of FIG. 1 including two wellbore laterals 130a and 130b, and an embodiments in which all of the possible valve state combination for the ICVs 144 of the well 106 are to be considered, this may include determining a predicted intake pressure for the ESP 142 for the following valve state combinations: (1,0), (2,0), (3,0) . . . (9,0), (10,0), (0,1), (0,2), (0,3) . . . (9,10) and (10,10). In an example in which all of the possible valve state combination for the ICVs 144 of the well 106 having the three laterals are to be considered, this may include determining a predicted intake pressure for the ESP 142 for the following valve state combinations: (1,0,0), (2,0,0), (3,0,0) . . . (9,0,0), (10,0,0), (0,1,0), (0,2,0), (0,3,0) . . . (9,9,10) and (10,10,10). In some embodiments, the predicted intake pressure for the ESP 142 for a given valve state combination and WHP is based on a liner interpolation of the modelings of the isolated test states and the comingled test state for the WHP. In some embodiments, interpolation of the models generated to determine a predicted intake pressure for an ESP for a candidate operating configuration (including a given WHP) includes determining, based on baseline production data 160 associated with the given WHP, a relationship of predicted intake pressure of the ESP 142 to surface flow rate (e.g., a linear relationship defining predicted intake pressure for the ESP as a function of surface flow rate for the given WHP), determining an estimated surface flow rate for the ICV 144 for the candidate operating configuration, and determining, based on application of the flow rate to the relationship of predicted intake pressure of the ESP 142 to estimated surface flow rate, a predicted intake pressure for the ESP 142 for the candidate operating configuration (including the given WHP).

In some embodiments, a productivity index (PI) can be determined based on the production data. This may involve determining, for each lateral, an isolated PI associated with production flow from the lateral in a fully-opened isolated operating state, and a comingled PI reduction factor associated with production flow from the lateral in a fully-opened comingled operating state. For example, in a state (10,0) the motherbore 130a may have an "isolated" PI of 50 barrels per day/psi (BPD/psi), in a state (10,10) the motherbore 130a may have a "comingled" PI of 30 BPD/psi, in a state (0,10) the first lateral 130b may have an "isolated" PI of 40 BPD/psi, and in the state (10,10) the first lateral 130b may have a "comingled" PI of 24 BPD/psi. In such a case, the reduction in the PIs for the comingled state versus the fully-opened states may be defined by a 0.6 PI reduction factor. When a lateral is restricted while the other laterals remains fully-opened during comingled production, the reduction in pressure in the lateral can generate a decrease in the PI of that lateral, and an increase in the PI of the other lateral. For example, where the motherbore ICV 144a of the example is subject to a 50% reduction in pressure, the motherbore comingled PI may drop by 50% to 15 BPD/psi (0.5*30 BPD/psi), and the first lateral comingled PI may increase by 50% to 32 BPD/psi (24 BPD/psi+(40 BPD/psi−24 BPD/psi)/2).

In some embodiments, determining a predicted intake pressure for the ESP 142 for a candidate operating configuration of an ICV 144 includes determining the predicted intake pressure for the ESP 142 based on interpolation of the models generated from the test states, including the isolated test states and the comingled test state. In some embodiments, interpolation of the models generated to determine a predicted intake pressure for an ESP for a candidate operating configuration (including a given WHP) includes determining, based on baseline production data 160 associated with the given WHP, a relationship of predicted intake pressure of the ESP 142 to surface flow rate (e.g., a linear relationship defining predicted intake pressure for the ESP as a function of surface flow rate for the given WHP), determining an estimated surface flow rate for the ICV 144 for the candidate operating configuration, and determining, based on application of the flow rate to the relationship of predicted intake pressure of the ESP 142 to estimated surface flow rate, a predicted intake pressure for the ESP 142 for the candidate operating configuration (including the given WHP).

Figure 7A:
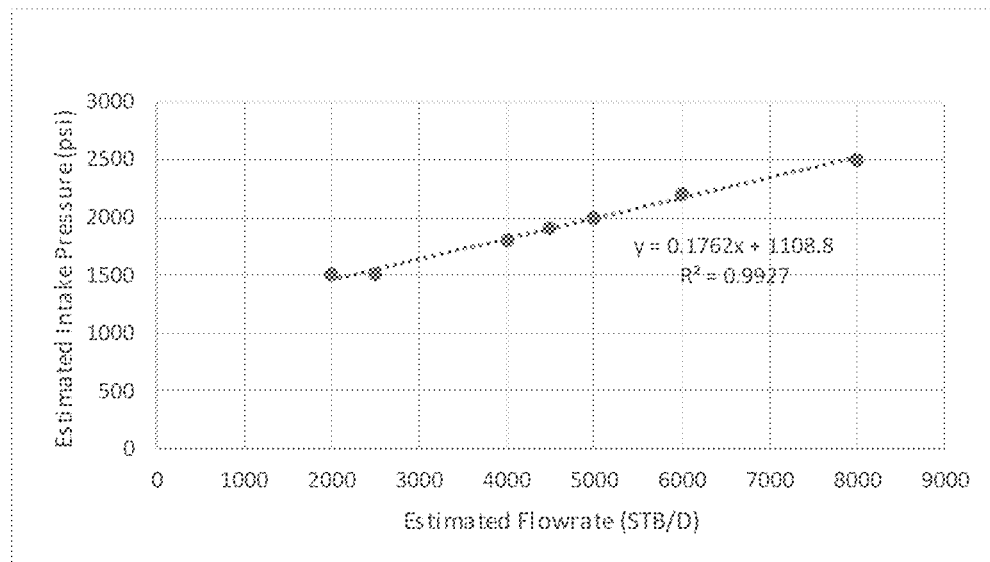
FIGS. 7A and 7B are plots that illustrate example relationships of intake pressure to wellhead flow rate in accordance with one or more embodiments.

For example, continuing with the two lateral example and the data of Table 1 of FIG. 3A, to determine a predicted intake pressure for the ESP 142 for the state (0,9), a model for the state (0,10) may be generated from the first lateral production data and an ICV performance curve for the first lateral ICV 144b in state 10 (see, e.g., the model of FIG. 4A), and a model for the state (0,8) may be generated from the first lateral production data and an ICV performance curve for the first lateral ICV 144b in state 8. A model for the valve state (0,9) (including a predicted intake pressure for the ESP 142 for the state (0,9)) may be generated based on an interpolation of the models for the states (0,10) and (0,8), and a corresponding ICV performance curve for the first lateral ICV 144b in state 9. The predicted intake pressure for the model of the ESP 142 for the state (0,9) and a WHP of 370 psi may be determined to be 2033 psi based on the following: (a) determining, based on the baseline production data 160 of Table 1 of FIG. 3A (associated with a WHP of 370 psi), a relationship of y=0.1762x+1108.08 defining a predicted intake pressure (y) of the ESP 142 to surface flow rate (x) for a WHP of 370 psi (e.g., the linear relationship of FIG. 7A defining estimated intake pressure for the ESP 142 as a function of surface flow rate for the given WHP of 370 psi); (b) determining an estimated surface flow rate of 5250 barrel per day (STB/day) for the ICV 144 for the candidate operating configuration (e.g., based on an interpolation of the measured flow rate values of 4500 STB/day and 6000 STB/day), and determining, based on application of the flow rate of 5250 STB/day to the relationship of predicted intake pressure of the ESP 142 to estimated surface flow rate for the WHP of 370 psi, a predicted intake pressure of 2033 psi for the ESP 142 for the candidate operating configuration (including the state (0,9) and the WHP of 370 psi).

As another example, continuing with the two lateral example and the data of Table 1 of FIG. 3A, to determine a predicted intake pressure for the ESP 142 for the state (5,10), a model for the state (10,10) may be generated from the comingled production data and ICV performance curves for the motherbore ICV 144a and first lateral ICV 144b in state 10 (see, e.g., the model of FIG. 4B), and a model for the state (10,0) may be generated in a similar manner from the motherbore production data and an ICV performance curve for the motherbore ICV 144a in state 10. A model for the state (5,10) (including a predicted intake pressure for the ESP 142 for the state (5,10)) may be generated based on an interpolation of the models for the states (10,10) and (10,0), and ICV performance curves for the motherbore ICV 144a and the first lateral ICV 144b in states 5 and 10, respectively. The predicted intake pressure for the model of the ESP 142 for the state (5,10) and a WHP of 370 psi may be determined to be 1770 psi based on the following: (a) determining, based on the baseline production data 160 of Table 1 of FIG. 3A (associated with a WHP of 370 psi), a relationship of y=0.1762x+1108.08 defining a predicted intake pressure (y) of the ESP 142 to surface flow rate (x) for a WHP of 370 psi (e.g., the linear relationship of FIG. 7A defining estimated intake pressure for the ESP 142 as a function of surface flow rate for the given WHP of 370 psi); (b) determining an estimated surface flow rate of 3750 STB/day for the ICV 144 for the candidate operating configuration (e.g., based on an established relationship between wellhead pressure (WHP) and surface flow rate for the well)), and determining, based on application of the flow rate of 3750 STB/day to the relationship of predicted intake pressure of the ESP 142 to estimated surface flow rate for the WHP of 370 psi, a predicted intake pressure of 1770 psi for the ESP 142 for the candidate operating configuration (including the state (5,10) and the WHP of 370 psi). In some embodiments, when multiple ICVs 144 contribute to the surface flow (e.g., a state where more than one ICV 144 is at least partially opened), the estimated surface flow rate is determined as a function of the fluid composition, the wellhead pressure (WHP), the well completion (e.g., wellbore depth and radius), and the choke valve flow areas (as determined by the ICV 144 states).

Figure 7B:
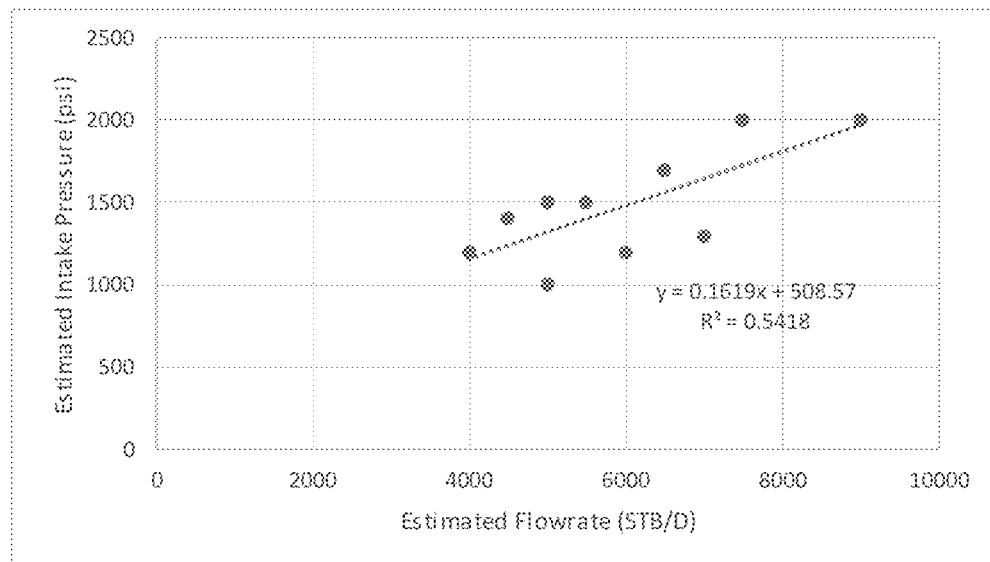

As yet another example, continuing with the three lateral example and the data of Table 2 of FIG. 3B, to determine a predicted intake pressure for the ESP 142 for the state (5,5,10), a model for the state (10,10,10) may be generated from the first lateral production data and ICV performance curves for the ICVs 144a, 144b and 144c in state 10 (see, e.g., the model of FIG. 4B), a model for the state (0,0,10) may be generated in a similar manner from the second lateral production data and an ICV performance curve for the second lateral ICV 144c in state 10. A model for the state (5,5,10) may be generated based on an interpolation of the models for the states (10,10,10) and (0,0,10), and ICV performance curves for the motherbore ICV 144a, the first lateral ICV 144b and the second lateral ICV 144c in states 5, 5 and 10, respectively. For example, the predicted intake pressure for the ESP 142 for the state (5,5,10) and a WHP of 370 psi may be determined to be 1298 psi based on the following: (a) determining, based on the baseline production data 160 of Table 1 of FIG. 3B (associated with a WHP of 370 psi), a relationship of y=0.1619x+508.57 defining a predicted intake pressure (y) of the ESP 142 to surface flow rate (x) for a WHP of 370 psi (e.g., the linear relationship of FIG. 7B defining estimated intake pressure for the ESP 142 as a function of surface flow rate for the given WHP of 370 psi); (b) determining an estimated surface flow rate of 4875 STB/day for the ICV 144 for the candidate operating configuration (e.g., based on an established relationship between wellhead pressure (WHP) and surface flow rate for the well), and determining, based on application of the flow rate of 4875 STB/day to the relationship of predicted intake pressure of the ESP 142 to estimated surface flow rate for the WHP of 370 psi, a predicted intake pressure of 1298 psi for the ESP 142 for the candidate operating configuration (including the state (5,5,10) and the WHP of 370 psi).

Each of the operating configurations associated with a predicted intake pressure that is within the operating intake pressure range for the ESP 142 (for example, the operating configurations associated with a predicted intake pressure within the operating intake pressure range of about 2,300-3,000 psi) may be identified as an operating configuration that satisfies the pump operating intake pressure. In some embodiments, a particular one of the operating configurations (for example, (9,7)) that are within the operating intake pressure range for the ESP 142 may be identified as the operating configuration that satisfies the pump operating intake pressure.

In some embodiments, operating the ICVs in accordance with the ICV operating configuration (block 208) includes controlling the ICVs to operate in their respective states. For example, where the operating configuration that satisfies the pump operating intake pressure is (9,7), which specifies that the ICVs 144a and 144b have respective states of 9 and 7, operating the ICVs in accordance with the ICV operating configuration may include commanding the ICV 144a to move into state 9, and commanding the ICV 144b to move into state 7. As another example, where the operating configuration that satisfies the pump operating intake pressure is (9,7,2), operating the ICVs in accordance with the ICV operating configuration may include commanding the ICV 144a to move into state 9, commanding the ICV 144b to move into state 7, and commanding the ICV 144c to move into state 2.

Figure 8:
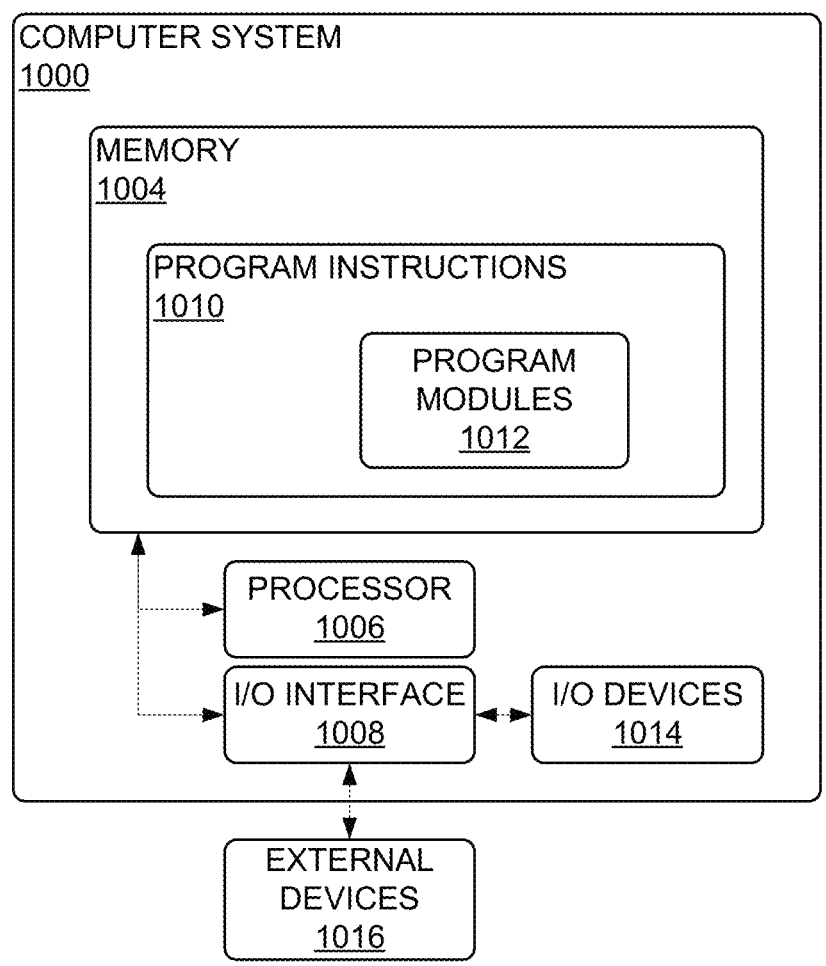
FIG. 8 is a diagram that illustrates an example computer system in accordance with one or more embodiments.

FIG. 8 is a diagram that illustrates an example computer system (or "system") 1000 in accordance with one or more embodiments. The system 1000 may include a memory 1004, a processor 1006 or an input/output (I/O) interface 1008. The memory 1004 may include non-volatile memory (for example, flash memory, read-only memory (ROM), programmable read-only memory (PROM), erasable programmable read-only memory (EPROM), electrically erasable programmable read-only memory (EEPROM)), volatile memory (for example, random access memory (RAM), static random access memory (SRAM), synchronous dynamic RAM (SDRAM)), or bulk storage memory (for example, CD-ROM or DVD-ROM, hard drives). The memory 1004 may include a non-transitory computer-readable storage medium having program instructions 1010 stored thereon. The program instructions 1010 may include program modules 1012 that are executable by a computer processor (for example, the processor 1006) to cause the functional operations described here, such as those described with regard to the control system 124 or the method 200.

The processor 1006 may be any suitable processor capable of executing program instructions. The processor 1006 may include a central processing unit (CPU) that carries out program instructions (for example, the program instructions of the program module(s) 1012) to perform the arithmetical, logical, and input/output operations described. The processor 1006 may include one or more processors. The I/O interface 1008 may provide an interface for communication with one or more I/O devices 1014, such as a joystick, a computer mouse, a keyboard, and a display screen (for example, an electronic display for displaying a graphical user interface (GUI)). The I/O devices 1014 may include one or more of the user input devices. The I/O devices 1014 may be connected to the I/O interface 1008 via a wired connection (for example, an Industrial Ethernet connection) or a wireless connection (for example, a Wi-Fi connection). The I/O interface 1008 may provide an interface for communication with one or more external devices 1016, such as sensors, valves, pumps, motors, other computers and networks. In some embodiments, the I/O interface 1008 includes one or both of an antenna and a transceiver. In some embodiments, the external devices 1016 include the ICVs 144, the wellhead pressure sensor 146, the flow rate sensor 148, the intake pressure sensor 150 or the ESP 142.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described here are to be taken as examples of embodiments. Elements and materials may be substituted for those illustrated and described here, parts and processes may be reversed or omitted, and certain features of the embodiments may be utilized independently, all as would be apparent to one skilled in the art after having the benefit of this description of the embodiments. Changes may be made in the elements described here without departing from the spirit and scope of the embodiments as described in the following claims. Headings used here are for organizational purposes only and are not meant to be used to limit the scope of the description.

It will be appreciated that the processes and methods described here are example embodiments of processes and methods that may be employed in accordance with the techniques described here. The processes and methods may be modified to facilitate variations of their implementation and use. The order of the processes and methods and the operations provided may be changed, and various elements may be added, reordered, combined, omitted, modified, and so forth. Portions of the processes and methods may be implemented in software, hardware, or a combination thereof. Some or all of the portions of the processes and methods may be implemented by one or more of the processors/modules/applications described here.

As used throughout this application, the word "may" is used in a permissive sense (meaning having the potential to), rather than the mandatory sense (meaning must). The words "include," "including," and "includes" mean including, but not limited to. As used throughout this application, the singular forms "a," "an," and "the" include plural referents unless the content clearly indicates otherwise. Thus, for example, reference to "an element" may include a combination of two or more elements. As used throughout this application, the term "or" is used in an inclusive sense, unless indicated otherwise. That is, a description of an element including A or B may refer to the element including one or both of A and B. As used throughout this application, the phrase "based on" does not limit the associated operation to being solely based on a particular item. Thus, for example, processing "based on" data A may include processing based at least in part on data A and based at least in part on data B, unless the content clearly indicates otherwise. As used throughout this application, the term "from" does not limit the associated operation to being directly from. Thus, for example, receiving an item "from" an entity may include receiving an item directly from the entity or indirectly from the entity (for example, by way of an intermediary entity). Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical, electronic or magnetic quantities within memories, registers, or other information storage devices, transmission devices, or display devices of the special purpose computer or similar special purpose electronic processing/computing device.

What is claimed is:

1. A hydrocarbon well system comprising:
inflow control valves (ICVs) disposed in a wellbore of a hydrocarbon well;
an electrical submersible pump (ESP) disposed in the wellbore of the hydrocarbon well; and
a well control system configured to perform the following operations:
conducting isolated production flow testing, comprising, for each inflow control valve (ICV) of the hydrocarbon well:
identifying a set of isolated test states for the ICV, the set of isolated test states comprising at least two partially-opened valve states and a fully-opened valve state;
closing the other ICVs of the hydrocarbon well to inhibit production flow through the other ICVs; and
for each isolated test state of the set of isolated test states:
operating, with the other ICVs closed, the ICV in the isolated test state to enable isolated production fluid flow through the ICV and the wellbore; and
determining an intake pressure for the isolated test state, the intake pressure for the isolated test state comprising a fluid pressure of the isolated production fluid flow at an intake of the ESP while the ICV is operated in the isolated test state with the other ICVs closed;
conducting comingled production flow testing, comprising:
operating the ICVs in a comingled test state, operating the ICVs in the comingled test state comprising simultaneously operating ICVs in a fully-opened valve state to enable comingled production fluid flow through the wellbore; and
determining an intake pressure for the comingled test state, the intake pressure for the comingled test state comprising a fluid pressure of the comingled production fluid flow at the intake of the ESP while the ICVs are operated in the comingled test state;
determining an operating intake pressure range for the ESP;
determining, for each isolated test state of each ICV of the hydrocarbon well and based on the intake pressure determined for the isolated test state, a model of isolated fluid pressure in the wellbore for the ICV operating in the isolated test state;
determining, based on the intake pressure for the comingled test state, a model of comingled fluid pressure in the wellbore;
determining a candidate operating configuration of the ICVs, the candidate operating configuration of the ICVs comprising a valve state combination for the ICVs, the valve state combination for the ICVs corresponding to the ICVs operating in individual valve states at the same time, and the individual valve state of each ICV being an opened valve state, a partially-opened valve state or a fully-opened valve state;
determining, based on the models of isolated fluid pressure in the wellbore and the model of comingled fluid pressure in the wellbore, a predicted intake pressure at the intake of the ESP for the candidate operating configuration;
determining that the predicted intake pressure at the intake of the ESP is within the operating intake pressure range for the ESP; and
operating, in response to determining that the predicted intake pressure at the intake of the ESP is within the operating intake pressure range for the ESP, the ICVs in the candidate operating configuration.

2. The system of claim 1, the operations further comprising:
determining a first candidate operating configuration of the ICVs, the first candidate operating configuration of the ICVs comprising a first valve state combination for the ICVs;
determining, based on the models of isolated fluid pressure in the wellbore and the model of comingled fluid pressure in the wellbore, a first predicted intake pressure at the intake of the ESP for the first candidate operating configuration of the ICVs;
determining that the first predicted intake pressure at the intake of the ESP is not within the operating intake pressure range for the ESP; and
identifying, in response to determining that the first predicted intake pressure at the intake of the ESP is not within the operating intake pressure range for the ESP, the candidate operating configuration of the ICVs.

3. The system of claim 1, wherein the candidate operating configuration of the ICVs specifies a respective valve state for each of the ICVs of the hydrocarbon well, and wherein operating the ICVs in the candidate operating configuration comprises, for each ICV of the ICVs of the hydrocarbon well, operating the ICV in the respective valve state specified for the ICV in the candidate operating configuration while maintaining a given wellhead pressure.

4. The system of claim 1, the operations further comprising:
determining possible operating configurations of the ICVs; and
for each of the possible operating configurations of the ICVs:
determining, based on the models of isolated fluid pressure in the wellbore and the model of comingled fluid pressure in the wellbore, a predicted intake pressure at the intake of the ESP for the possible operating configuration of the ICV,
wherein the candidate operating configuration of the ICVs is one of the possible operating states of the ICVs.

5. The system of claim 4, wherein the possible operating configurations of the ICVs comprise all possible combinations of states of the ICVs of the hydrocarbon well.

6. The system of claim 1, wherein the model of isolated fluid pressure in the wellbore for the ICV operating in the isolated test state comprises a gradient of fluid pressure in the wellbore for the ICV operating in the isolated test state, and wherein the model of comingled fluid pressure in the wellbore comprises a gradient of fluid pressure in the wellbore for the ICVs operating in the comingled test state.

7. The system of claim 1, wherein determining the predicted intake pressure at the intake of the ESP for the candidate operating state of the ICVs comprises determining a linear relationship of intake pressure to flow rate, determining an estimated flow rate for the candidate operating state of the ICVs, and determining the predicted intake pressure at the intake of the ESP for the candidate operating state of the ICVs based on application of the estimated flow rate for the candidate operating state of the ICVs to the linear relationship of intake pressure to flow rate.

8. The system of claim 1, wherein the at least two partially opened valve states comprise a first valve state comprising a choke of about 1-10%, and a second valve state comprising a choke of about 11-50%.

9. A method of operating a hydrocarbon well having inflow control valves (ICVs) and an electrical submersible pump (ESP) disposed in a wellbore of the hydrocarbon well, the method comprising:
  conducting isolated production flow testing, comprising, for each inflow control valve (ICV) of the hydrocarbon well:
    identifying a set of isolated test states for the ICV, the set of isolated test states comprising at least two partially-opened valve states and a fully-opened valve state;
    closing the other ICVs of the hydrocarbon well to inhibit production flow through the other ICVs; and
    for each isolated test state of the set of isolated test states:
      operating, with the other ICVs closed, the ICV in the isolated test state to enable isolated production fluid flow through the ICV and the wellbore; and
      determining an intake pressure for the isolated test state, the intake pressure for the isolated test state comprising a fluid pressure of the isolated production fluid flow at an intake of the ESP while the ICV is operated in the isolated test state with the other ICVs closed;
  conducting comingled production flow testing, comprising:
    operating the ICVs in a comingled test state, operating the ICVs in the comingled test state comprising simultaneously operating ICVs in a fully-opened valve state to enable comingled production fluid flow through the wellbore; and
    determining an intake pressure for the comingled test state, the intake pressure for the comingled test state comprising a fluid pressure of the comingled production fluid flow at the intake of the ESP while the ICVs are operated in the comingled test state;
  determining an operating intake pressure range for the ESP;
  determining, for each isolated test state of each ICV of the hydrocarbon well and based on the intake pressure determined for the isolated test state, a model of isolated fluid pressure in the wellbore for the ICV operating in the isolated test state;
  determining, based on the intake pressure for the comingled test state, a model of comingled fluid pressure in the wellbore;
  determining a candidate operating configuration of the ICVs, the candidate operating configuration of the ICVs comprising a valve state combination for the ICVs, the valve state combination for the ICVs corresponding to the ICVs operating in individual valve states at the same time, and the individual valve state of each ICV being an opened valve state, a partially-opened valve state or a fully-opened valve state;
  determining, based on the models of isolated fluid pressure in the wellbore and the model of comingled fluid pressure in the wellbore, a predicted intake pressure at the intake of the ESP for the candidate operating configuration;
  determining that the predicted intake pressure at the intake of the ESP is within the operating intake pressure range for the ESP; and
  operating, in response to determining that the predicted intake pressure at the intake of the ESP is within the operating intake pressure range for the ESP, the ICVs in the candidate operating configuration.

10. The method of claim 9, further comprising:
  determining a first candidate operating configuration of the ICVs, the first candidate operating configuration of the ICVs comprising a first valve state combination for the ICVs;
  determining, based on the models of isolated fluid pressure in the wellbore and the model of comingled fluid pressure in the wellbore, a first predicted intake pressure at the intake of the ESP for the first candidate operating configuration of the ICVs;
  determining that the first predicted intake pressure at the intake of the ESP is not within the operating intake pressure range for the ESP; and
  identifying, in response to determining that the first predicted intake pressure at the intake of the ESP is not within the operating intake pressure range for the ESP, the candidate operating configuration of the ICVs.

11. The method of claim 9, wherein the candidate operating configuration of the ICVs specifies a respective valve state for each of the ICVs of the hydrocarbon well, and wherein operating the ICVs in the candidate operating configuration comprises, for each ICV of the ICVs of the hydrocarbon well, operating the ICV in the respective valve state specified for the ICV in the candidate operating configuration while maintaining a given wellhead pressure.

12. The method of claim 9, further comprising:
  determining possible operating configurations of the ICVs; and
  for each of the possible operating configurations of the ICVs:
    determining, based on the models of isolated fluid pressure in the wellbore and the model of comingled fluid pressure in the wellbore, a predicted intake pressure at the intake of the ESP for the possible operating configuration of the ICV,
  wherein the candidate operating configuration of the ICVs is one of the possible operating states of the ICVs.

13. The method of claim 12, wherein the possible operating configurations of the ICVs comprise all possible combinations of states of the ICVs of the hydrocarbon well.

14. The method of claim 9, wherein the model of isolated fluid pressure in the wellbore for the ICV operating in the isolated test state comprises a gradient of fluid pressure in the wellbore for the ICV operating in the isolated test state, and wherein the model of comingled fluid pressure in the wellbore comprises a gradient of fluid pressure in the wellbore for the ICVs operating in the comingled test state.

15. The method of claim 9, wherein determining the predicted intake pressure at the intake of the ESP for the candidate operating state of the ICVs comprises determining a linear relationship of intake pressure to flow rate, determining an estimated flow rate for the candidate operating state of the ICVs, and determining the predicted intake pressure at the intake of the ESP for the candidate operating state of the ICVs based on application of the estimated flow rate for the candidate operating state of the ICVs to the linear relationship of intake pressure to flow rate.

16. The method of claim 9, wherein the at least two partially opened valve states comprise a first valve state comprising a choke of about 1-10%, and a second valve state comprising a choke of about 11-50%.

17. A non-transitory computer readable medium comprising program instructions stored thereon that are executable by a processor to cause the following operations for operating a hydrocarbon well having inflow control valves (ICVs) and an electrical submersible pump (ESP) disposed in a wellbore of the hydrocarbon well:
   conducting isolated production flow testing, comprising, for each inflow control valve (ICV) of the hydrocarbon well:
      identifying a set of isolated test states for the ICV, the set of isolated test states comprising at least two partially-opened valve states and a fully-opened valve state;
      closing the other ICVs of the hydrocarbon well to inhibit production flow through the other ICVs; and
      for each isolated test state of the set of isolated test states:
         operating, with the other ICVs closed, the ICV in the isolated test state to enable isolated production fluid flow through the ICV and the wellbore; and
         determining an intake pressure for the isolated test state, the intake pressure for the isolated test state comprising a fluid pressure of the isolated production fluid flow at an intake of the ESP while the ICV is operated in the isolated test state with the other ICVs closed;
   conducting comingled production flow testing, comprising:
      operating the ICVs in a comingled test state, operating the ICVs in the comingled test state comprising simultaneously operating ICVs in a fully-opened valve state to enable comingled production fluid flow through the wellbore; and
      determining an intake pressure for the comingled test state, the intake pressure for the comingled test state comprising a fluid pressure of the comingled production fluid flow at the intake of the ESP while the ICVs are operated in the comingled test state;
   determining an operating intake pressure range for the ESP;
   determining, for each isolated test state of each ICV of the hydrocarbon well and based on the intake pressure determined for the isolated test state, a model of isolated fluid pressure in the wellbore for the ICV operating in the isolated test state;
   determining, based on the intake pressure for the comingled test state, a model of comingled fluid pressure in the wellbore;
   determining a candidate operating configuration of the ICVs, the candidate operating configuration of the ICVs comprising a valve state combination for the ICVs, the valve state combination for the ICVs corresponding to the ICVs operating in individual valve states at the same time, and the individual valve state of each ICV being an opened valve state, a partially-opened valve state or a fully-opened valve state;
   determining, based on the models of isolated fluid pressure in the wellbore and the model of comingled fluid pressure in the wellbore, a predicted intake pressure at the intake of the ESP for the candidate operating configuration;
   determining that the predicted intake pressure at the intake of the ESP is within the operating intake pressure range for the ESP; and
   operating, in response to determining that the predicted intake pressure at the intake of the ESP is within the operating intake pressure range for the ESP, the ICVs in the candidate operating configuration.

18. The medium of claim 17, the operations further comprising:
   determining a first candidate operating configuration of the ICVs, the first candidate operating configuration of the ICVs comprising a first valve state combination for the ICVs;
   determining, based on the models of isolated fluid pressure in the wellbore and the model of comingled fluid pressure in the wellbore, a first predicted intake pressure at the intake of the ESP for the first candidate operating configuration of the ICVs;
   determining that the first predicted intake pressure at the intake of the ESP is not within the operating intake pressure range for the ESP; and
   identifying, in response to determining that the first predicted intake pressure at the intake of the ESP is not within the operating intake pressure range for the ESP, the candidate operating configuration of the ICVs.

19. The medium of claim 17, wherein the candidate operating configuration of the ICVs specifies a respective valve state for each of the ICVs of the hydrocarbon well, and wherein operating the ICVs in the candidate operating configuration comprises, for each ICV of the ICVs of the hydrocarbon well, operating the ICV in the respective valve state specified for the ICV in the candidate operating configuration while maintaining a given wellhead pressure.

20. The medium of claim 17, the operations further comprising:
   determining possible operating configurations of the ICVs; and
   for each of the possible operating configurations of the ICVs:
      determining, based on the models of isolated fluid pressure in the wellbore and the model of comingled fluid pressure in the wellbore, a predicted intake pressure at the intake of the ESP for the possible operating configuration of the ICV,
   wherein the candidate operating configuration of the ICVs is one of the possible operating states of the ICVs.

21. The medium of claim 20, wherein the possible operating configurations of the ICVs comprise all possible combinations of states of the ICVs of the hydrocarbon well.

22. The medium of claim 17, wherein the model of isolated fluid pressure in the wellbore for the ICV operating in the isolated test state comprises a gradient of fluid pressure in the wellbore for the ICV operating in the isolated test state, and wherein the model of comingled fluid pressure in the wellbore comprises a gradient of fluid pressure in the wellbore for the ICVs operating in the comingled test state.

23. The medium of claim 17, wherein determining the predicted intake pressure at the intake of the ESP for the candidate operating state of the ICVs comprises determining a linear relationship of intake pressure to flow rate, determining an estimated flow rate for the candidate operating state of the ICVs, and determining the predicted intake pressure at the intake of the ESP for the candidate operating state of the ICVs based on application of the estimated flow rate for the candidate operating state of the ICVs to the linear relationship of intake pressure to flow rate.

24. The medium of claim 17, wherein the at least two partially opened valve states comprise a first valve state comprising a choke of about 1-10%, and a second valve state comprising a choke of about 11-50%.

* * * * *